US012808093B2

(12) United States Patent
Marchini et al.

(10) Patent No.: US 12,808,093 B2
(45) Date of Patent: Nov. 24, 2026

(54) POLYOLEFIN FILAMENT

(71) Applicant: Basell Poliolefine Italia S.r.l., Milan (IT)

(72) Inventors: Roberta Marchini, Ferrara (IT); Gianni Perdomi, Ferrara (IT); Gianluca Musacchi, Ferrara (IT); Fabio Di Pietro, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 202 days.

(21) Appl. No.: 18/717,910

(22) PCT Filed: Dec. 5, 2022

(86) PCT No.: PCT/EP2022/084370

§ 371 (c)(1),
(2) Date: Jun. 7, 2024

(87) PCT Pub. No.: WO2023/104697

PCT Pub. Date: Jun. 15, 2023

(65) Prior Publication Data

US 2025/0051973 A1 Feb. 13, 2025

(30) Foreign Application Priority Data

Dec. 10, 2021 (EP) .................................... 21213669

(51) Int. Cl.

| | |
|---|---|
| ***D01F 8/06*** | (2006.01) |
| ***C08L 23/12*** | (2006.01) |
| ***C08L 23/20*** | (2025.01) |

(52) U.S. Cl.

CPC ................ *D01F 8/06* (2013.01); *C08L 23/12* (2013.01); *C08L 23/20* (2013.01); *C08L 2203/12* (2013.01); *C08L 2205/02* (2013.01); *D10B 2321/022* (2013.01); *D10B 2401/06* (2013.01)

(58) Field of Classification Search

CPC .......... D01F 6/46; D01F 8/06; C08L 2203/12; C08L 23/12; C08L 23/20; C08L 2205/02; D10B 2401/06

USPC .......................................................... 428/361

See application file for complete search history.

(56) References Cited

U.S. PATENT DOCUMENTS

| | | | | |
|---|---|---|---|---|
| 4,075,290 | A | 2/1978 | Denzel et al. | |
| 4,399,054 | A | 8/1983 | Ferraris et al. | |
| H1583 | H | 8/1996 | Hwo et al. | |
| 5,945,215 | A * | 8/1999 | Bersted | D02G 3/445 428/364 |
| 7,776,986 | B2 | 8/2010 | Bacci et al. | |
| 2006/0020096 | A1 | 1/2006 | Schottek et al. | |
| 2010/0267305 | A1 | 10/2010 | Di Pietro et al. | |
| 2010/0304052 | A1 | 12/2010 | Chai et al. | |
| 2013/0217831 | A1 | 8/2013 | Vanzini et al. | |

FOREIGN PATENT DOCUMENTS

| | | | | |
|---|---|---|---|---|
| EP | 0045977 | A2 | 2/1982 | |
| EP | 0361493 | A1 | 4/1990 | |
| EP | 0728769 | A1 | 8/1996 | |
| EP | 0782587 | A1 | 7/1997 | |
| JP | 2005002280 | A | 1/2005 | |
| WO | 9840419 | A1 | 9/1998 | |
| WO | 2012049132 | A1 | 4/2012 | |
| WO | WO-2020127296 | A1 * | 6/2020 | D04H 1/43832 |

OTHER PUBLICATIONS

The International Search Report and The Written Opinion for PCT/EP2022/084370 mailed Mar. 27, 2023.

* cited by examiner

*Primary Examiner* — Camie S Thompson

(57) ABSTRACT

A stretched polyolefin filament, having elongation at break EB of equal to or higher than 80% and a ratio EB/SR, where SR is the stretching ratio, of equal to or lower than 45, made from or containing:

a polyolefin composition (I), made from or containing

A) from 40% to 78% by weight of a propylene polymer;

B) from 22% to 60% by weight of a butene-1 polymer having:

1) a flexural modulus value from 100 to 800 MPa;

2) a ratio $MI_{10}/MI_2$ of from 20 to 40; and 3) a content of fraction soluble in xylene at 0 °C of 15% by weight or lower;

wherein the amounts of A) and B) are referred to the total weight of A)+B).

11 Claims, No Drawings

POLYOLEFIN FILAMENT

This application is the U.S. National Phase of PCT International Application PCT/EP2022/084370, filed Dec. 5, 2022, claiming benefit of priority to European Patent Application No. 21213669.1, filed Dec. 10, 2021, the disclosures of which are incorporated herein by reference in their entirety.

FIELD OF THE INVENTION

In general, the present disclosure relates to the field of chemistry. More specifically, the present disclosure relates to polymer chemistry. In particular, the present disclosure relates to a polyolefin filament.

BACKGROUND OF THE INVENTION

As used herein, the term "filament" refers to fibers for textile and carpeting applications.

In some instances, the filament has a titer of at least 500 denier (hereinafter called "den").

In some instances, applications for the filament include ropes and yarns for nets, geotextiles, and protective netting in agriculture and building industry.

SUMMARY OF THE INVENTION

In a general embodiment, the present disclosure provides a stretched polyolefin filament, having elongation at break EB equal or greater than 80% and a ratio EB/SR where SR is the stretching ratio, of equal to or lower than 45, made from or containing:

a polyolefin composition, hereinafter called "polyolefin composition (I)", made from or containing A) from 40% to 78% by weight of a propylene polymer; and B) from 22% to 60% by weight of a butene-1 polymer having:

1) a flexural modulus value from 100 to 800 MPa;

2) a ratio $MI_{10}/MI_2$ of from 20 to 40, wherein $MI_{10}$ is the Melt Flow Index MI at 190 °C with a load of 10 kg and $MI_2$ is the Melt Flow Index MI at 190 °C with a load of 2.16 kg, both measured according to ISO 1133-1:2011; and 3) a content of fraction soluble in xylene at 0 °C of 15% by weight or lower, referred to the total weight of B);

wherein the amounts of A) and B) are referred to the total weight of A)+B), EB is measured on a single filament, 7 days after preparation of the filament, using a dynamometer with clamps distance of 250 mm and applied elongation speed of 250 mm/min, and the flexural modulus is measured according to norm ISO 178:2010, 10 days after molding.

In some embodiments, the filaments for preparing nets, ropes, and brushes. In some embodiments, the present disclosure provides an article of manufacture made from or containing the stretched polyolefin filament.

DETAILED DESCRIPTION OF THE INVENTION

In some embodiments, the stretched polyolefin filament, has elongation at break EB equal or greater than 80%, alternatively equal or greater than 90%, alternatively of from 80% to 130%, alternatively from 90% to 130%, and the ratio EB/SR, where SR is the stretching ratio, of equal to or lower than 45, alternatively equal to or lower than 40, made from or containing:

a polyolefin composition (I) made from or containing

A) from 40% to 78% by weight, alternatively from 45% to 75% by weight, of a propylene polymer; and B) from 22% to 60% by weight, alternatively from 25% to 55% by weight, of a butene-1 polymer having:

1) a flexural modulus value from 100 to 800 MPa, alternatively from 250 to 600 MPa, alternatively from 300 to 600 MPa;

2) a ratio $MI_{10}/MI_2$ of from 20 to 40, alternatively from 25 to 35, wherein $MI_{10}$ is the Melt Flow Index MI at 190 °C with a load of 10 kg and $MI_2$ is the Melt Flow Index MI at 190 °C with a load of 2.16 kg, both measured according to ISO 1133-1:2011; and 3) a content of fraction soluble in xylene at 0 °C of 15% by weight or lower, alternatively of 10% by weight or lower, referred to the total weight of B);

wherein the amounts of A) and B) are referred to the total weight of A)+B), EB is measured on a single filament, 7 days after preparation of the filament, using a dynamometer with clamps distance of 250 mm and applied elongation speed of 250 mm/min and the flexural modulus is measured according to norm ISO 178:2010, 10 days after molding.

In some embodiments, the lower limit of the ratio EB/SR is 15, alternatively 23, alternatively 25. In some embodiments, the lower limit of the content of fraction soluble in xylene at 0 °C is 0.5% by weight.

In some embodiments, the polyolefin filament has the following additional features, measured on a single filament, 7 days after preparation of the filament, using a dynamometer with clamps distance of 250 mm and applied elongation speed of 250 mm/min.:

Tenacity of 1.9 or higher, alternatively 1.95 or higher, alternatively from 1.9 to 3 or from 1.95 to 3; or Load at break from 2.5 to 5 kg.

As used herein, the expression "propylene polymer" includes polymers selected from the group consisting of propylene homopolymers, propylene copolymers, and mixtures thereof. In some embodiments, the propylene polymer includes random copolymers.

As used herein, the expression "butene-1 polymer" includes polymers selected from the group consisting of butene-1 homopolymers, butene-1 copolymers, and mixtures thereof.

In some embodiments, A) is made from or containing one or more propylene copolymers made from or containing one or more comonomer(s). In some embodiments, the comonomers are selected from the group consisting of ethylene and $CH_2{=}CHR$ alpha-olefins, where R is a $C_2$-$C_8$ alkyl radical. In some embodiments, the $CH_2{=}CHR$ alpha-olefins are selected from the group consisting of butene-1, pentene-1, 4-methyl-pentene-1, hexene-1, and octene-1.

In some embodiments, the comonomer is selected from the group consisting of ethylene, butene-1, and hexene-1.

In some embodiments, B) made from or containing one or more butene-1 copolymers is made from or containing one or more comonomer(s). In some embodiments, the comonomers are selected from the group consisting of ethylene, propylene, and $CH_2{=}CHR$ alpha-olefins, where R is a $C_3$-$C_8$ alkyl radical. In some embodiments, the $CH_2{=}CHR$ alpha-olefins are selected from the group consisting of pentene-1, 4-methyl-pentene-1, hexene-1, and octene-1.

In some embodiments, the comonomer is selected from the group consisting of ethylene, propylene, and hexene-1.

As used herein, the term "copolymers" includes polymers containing more than a single kind of comonomers.

In some embodiments, the propylene polymer component A) has at least one of the following additional features:

a content of comonomer(s) from 0.5 to 15% by weight, alternatively from 1 to 12% by weight;

a MIL from 0.1 to 400 g/10 min., alternatively from 0.5 to 150 g/10 min., alternatively from 0.5 to 100 g/10 min., where MIL is the melt flow index at 230 °C with a load of 2.16 kg, determined according to ISO 1133-2:2011;

an amount of fraction insoluble in xylene at 25 °C equal to or higher than 85% by weight, alternatively equal to or higher than 90% by weight; and a flexural modulus higher than 200 MPa, alternatively higher than 400 MPa. In some embodiments, the propylene polymer component A) has a content of comonomer from 0.5 to 6% by weight, wherein the comonomer is ethylene or hexene-1. In some embodiments, the amount of fraction insoluble in xylene at 25 °C is equal to or higher than 95% by weight, wherein the propylene polymer component A) is made from or containing propylene homopolymers. In some embodiments, the amount of fraction insoluble in xylene at 25 °C has an upper limit of 99%, wherein the propylene polymer component A) is made from or containing propylene homopolymers. In some embodiments, the amount of fraction insoluble in xylene at 25 °C has an upper limit of 96%, wherein the propylene polymer component A) is made from or containing propylene copolymers. In some embodiments, the flexural modulus has an upper limit of 2000 MPa.

In some embodiments, the propylene homopolymers and propylene copolymers are commercially available.

In some embodiments, the homopolymers and copolymers of propylene are commercially available from LyondellBasell Industries under the trademark Moplen.

In some embodiments, the propylene polymers are prepared by using a Ziegler-Natta catalyst or a metallocene-based catalyst system in the polymerization process.

In some embodiments, a Ziegler-Natta catalyst is made from or containing the product of the reaction of an organometallic compound of group 1, 2 or 13 of the Periodic Table of Elements with a transition metal compound of groups 4 to 10 of the Periodic Table of Elements (new notation). In some embodiments, the transition metal compound is selected from the group consisting of compounds of Ti, V, Zr, Cr, and Hf. In some embodiments, the transition metal compound is supported on $MgCl_2$.

In some embodiments, the catalysts are made from or containing the product of the reaction of the organometallic compound of group 1, 2 or 13 of the Periodic Table of Elements, with a solid catalyst component made from or containing a Ti compound and an electron donor compound supported on $MgCl_2$.

In some embodiments, the organometallic compounds are aluminum alkyl compounds.

In some embodiments, the Ziegler-Natta catalysts are made from or containing the product of reaction of:

1) a solid catalyst component made from or containing a Ti compound, alternatively a halogenated Ti compound, and an electron donor (internal electron-donor) supported on $MgCl_2$;

2) an aluminum alkyl compound (cocatalyst); and, optionally, 3) an electron-donor compound (external electron-donor).

In some embodiment, the Ti compound is $TiCl_4$.

In some embodiments, the solid catalyst component (1) contains, as electron-donor, a compound selected from the group consisting of ethers, ketones, lactones, compounds containing N, P and/or S atoms, and mono- and dicarboxylic acid esters.

In some embodiments, the catalysts are as described in U.S. Pat. No. 4,399,054 and European Patent No. 45977.

In some embodiments, the internal electron-donor compounds are selected from the group consisting of phthalic acid esters and succinic acid esters. In some embodiments, the phthalic acid ester is diisobutyl phthalate.

In some embodiments, the internal electron-donors are the 1,3-diethers described in European Patent Application Nos. EP-A-361 493 and 728769.

In some embodiments, cocatalysts (2) are trialkyl aluminum compounds. In some embodiments, the trialkyl aluminum compounds are selected from the group consisting of Al-triethyl, Al-triisobutyl, and Al-tri-n-butyl.

In some embodiments, the electron-donor compounds (3) used as external electron-donors (added to the Al-alkyl compound) are selected from the group consisting of aromatic acid esters, heterocyclic compounds, and silicon compounds containing at least one Si—OR bond (where R is a hydrocarbon radical). In some embodiments, the aromatic acid esters are alkylic benzoates. In some embodiments, the heterocyclic compounds are selected from the group consisting of 2,2,6,6-tetramethylpiperidine and 2,6-diisopropylpiperidine.

In some embodiments, the silicon compounds are selected from the group consisting of (tert-butyl)$_2$Si(OCH$_3$)$_2$, (cyclohexyl)(methyl)Si (OCH$_3$)$_2$, (phenyl)$_2$Si(OCH$_3$)$_2$, and (cyclopentyl)$_2$Si(OCH$_3$)$_2$.

In some embodiments, the 1,3-diethers are used as external electron-donors. In some embodiments, the internal electron-donor is a 1,3-diether, and the external electron-donor is omitted.

In some embodiments, the catalysts are precontacted with small quantities of olefin (prepolymerization), maintaining the catalyst in suspension in a hydrocarbon solvent, and polymerizing at temperatures from room to 60 °C, thereby producing a quantity of polymer from 0.5 to 3 times the weight of the catalyst.

In some embodiments, the operation takes place in liquid monomer, producing a quantity of polymer up to 1000 times the weight of the catalyst.

In some embodiments, the metallocene-based catalyst systems are as described in United States Patent Application No. 20060020096 and Patent Cooperation Treaty Publication No. WO98040419.

In some embodiments, the polymerization is carried out in a single step, alternatively in two or more steps under different polymerization conditions.

In some embodiments, the polymerization occurs in liquid phase (, gas phase, or liquid-gas phase. In some embodiments, liquid propylene is the diluent.

In some embodiments, molecular weight regulators are used. In some embodiments, the molecular weight regulators are chain transfer agents. In some embodiment, the chain transfer agent is hydrogen or $ZnEt_2$.

In some embodiments, the polymerization temperature is from 40 to 120 °C; alternatively from 50 to 80 °C.

In some embodiments, the polymerization pressure is atmospheric or higher.

In some embodiments, the polymerization is carried out in liquid propylene, the pressure competes with the vapor pressure of the liquid propylene at the operating temperature used, and the pressure is modified by the vapor pressure of the small quantity of inert diluent used to feed the catalyst mixture, by the overpressure of optional monomers, and by the hydrogen used as molecular weight regulator.

In some embodiments, the propylene polymer A) is produced by a polymerization process carried out in a gas-phase polymerization reactor having at least two interconnected polymerization zones, as described in European Patent Application No. 782 587.

In some embodiments, the process is carried out in a first and in a second interconnected polymerization zones into which propylene and the optional comonomers are fed in the presence of the catalyst system and from which the polymer produced is discharged. In some embodiments, the growing polymer particles flow upward through the first polymerization zone (riser) under fast fluidization conditions, leave the riser, and enter the second polymerization zone (downcomer). The polymer particles flow downward in a densified form under the action of gravity, leave the downcomer, and are reintroduced into the riser, thereby establishing a circulation of polymer between the riser and the downcomer.

In the downcomer, high values of density of the solid are reached, which approach the bulk density of the polymer. In some embodiments, a positive gain in pressure is obtained along the direction of flow, thereby providing for reintroduction of the polymer into the riser without an additional mechanical device. In some embodiments, the "loop" circulation is established and defined by the balance of pressures between the two polymerization zones and by the head loss introduced into the system.

In some embodiments, the condition of fast fluidization in the riser is established by feeding a gas mixture made from or containing the monomers to the riser. In some embodiments, the gas mixture is fed below the point of reintroduction of the polymer into the riser by the use of a gas distributor. In some embodiments, the velocity of transport gas into the riser is higher than the transport velocity under the operating conditions, alternatively from 2 to 15 m/s.

In some embodiments, the polymer and the gaseous mixture leaving the riser are conveyed to a solid/gas separation zone. From the separation zone, the polymer enters the downcomer. The gaseous mixture leaving the separation zone is compressed, cooled, and transferred to the riser. In some embodiments, make-up monomers or molecular weight regulators are added to the gaseous mixture. In some embodiments, the transfer is carried out via a recycle line for the gaseous mixture.

In some embodiments, the control of the polymer circulation between the two polymerization zones is carried out by metering the amount of polymer leaving the downcomer. In some embodiments, the metering is for controlling the flow of solids, such as mechanical valves.

In some embodiments, the process is carried out under operating pressures of between 0.5 and 10 MPa, alternatively between 1.5 to 6 MPa.

Optionally, one or more inert gases are maintained in the polymerization zones. In some embodiments, the inert gases are in quantities such that the sum of the partial pressures of the inert gases is between 5 and 80% of the total pressure of the gases. In some embodiments, the inert gases are nitrogen or an aliphatic hydrocarbon.

In some embodiments, the catalyst is fed to the riser at any point of the riser. In some embodiments, the catalyst is fed at any point of the downcomer. In some embodiments, the catalyst is in any physical state. In some embodiments, the catalysts are in solid or liquid state.

In some embodiments, the butene-1 polymer component B) is commercially available.

In some embodiments, the butene-1 polymer component B) is a linear polymer, which is highly isotactic.

In some embodiments, the butene-1 polymer component B) has an isotacticity from 90 to 99%, alternatively from 93 to 99%, alternatively from 95 to 99%, measured as mmmm pentads/total pentads with $^{13}C$-NMR operating at 150.91 MHz, or as quantity by weight of matter insoluble in xylene at 0 °C.

In some embodiments, the butene-1 polymer component B) has a $MI_2$ value of from 0.05 to 50 g/10 min., alternatively from 0.1 to 10 g/10 min.

In some embodiments, the $MI_{10}$ value of the butene-1 polymer component B) is of 1 to 100 g/10 min., alternatively of 2 to 50 g/10 min.

In some embodiments, the butene-1 polymer component B) is a homopolymer.

In some embodiments, the butene-1 polymer B) is a copolymer, having a comonomer content of from 0.5% to 10% by mole, alternatively of from 0.7% to 9% by mole. In some embodiments, the comonomer is ethylene.

In some embodiments, the butene-1 polymer component B) is a butene-1 polymer composition made from or containing:

- B1) a butene-1 homopolymer or a copolymer of butene-1 with at least one comonomer selected from the group consisting of ethylene, propylene, the previously defined $CH_2{=}CHR$ olefins, and mixtures thereof, having a copolymerized comonomer content of up to 2% by mole; and
- B2) a copolymer of butene-1 with at least one comonomer selected from the group consisting of ethylene, propylene, the previously defined $CH_2{=}CHR$ olefins, and mixtures thereof, having a copolymerized comonomer content of from 3 to 25% by mole; and having a total copolymerized comonomer content of 0.5-18% by mole, alternatively of from 0.7 to 15% by mole, referred to the sum of B1)+B2).

In some embodiments, the relative amounts of B1) and B2) range from 10% to 50% by weight, alternatively from 15% to 45% by weight, of B1) and from 90% to 50% by weight, alternatively from 85% to 55% by weight, of B2), wherein the amounts being referred to the sum of B1)+B2).

In some embodiments, the butene-1 polymer component B) has at least one of the following additional features:

- a molecular weight distribution Mw/Mn equal to higher than 4, alternatively equal to or higher than 5, wherein Mw is the weight average molar mass and Mn is the number average molar mass, measured by Gel Permeation Chromatography;
- a melting point TmII, measured by DSC (Differential Scanning Calorimetry) in the second heating run with a scanning speed of 10 °C/min., equal to or lower than 125 °C, alternatively equal to or lower than 120 °C; or
- an X-ray crystallinity of from 25 to 65%. In some embodiments, the molecular weight distribution Mw/Mn has an upper limit of 10. In some embodiments, the melting point TmII has a lower limit of 75 °C.

In some embodiments, the butene-1 polymer component B) has at least one of the following further additional features:

- an intrinsic viscosity (I.V.) measured in tetrahydronaphthalene (THN) at 135 °C, equal to or lower than 5 dl/g, alternatively equal to or lower than 3 dl/g;

an Mw equal to or greater than 100000 g/mol, alternatively from 100000 to 650000 g/mol;

a melting point TmI, measured by DSC with a scanning speed of 10 °C/min., from 95 °C to 135 °C;

a density of 885-925 kg/m$^3$, alternatively of 900-920 kg/m$^3$, alternatively of 912-920 kg/m$^3$. In some embodiments, the intrinsic viscosity (I.V.) has a lower limit of 0.4 dl/g.

In some embodiments, the butene-1 polymer component B) is prepared using $TiCl_3$ based Ziegler-Natta catalysts, aluminum derivatives as cocatalysts, and the catalytic systems supported on $MgCl_2$ described above for the preparation of the propylene polymer A). In some embodiments, the aluminum derivatives are aluminum halides.

In some embodiments, the supported catalytic systems are used with diethyl or diisobutyl 3,3-dimethyl glutarate as internal electron donor compounds.

In some embodiments, external electron donor compounds are selected from the group consisting of cyclohexyltrimethoxysilane, t-butyltrimethoxysilane, diisopropyldrimethoxysilane, and thexyltrimethoxysilane. In some embodiments, the external electron donor compound is thexyltrimethoxysilane.

In some embodiments, the butene-1 polymer component B) is obtained by polymerizing the monomer(s) in the presence of a metallocene catalyst system obtainable by contacting:

a stereorigid metallocene compound;

an alumoxane or a compound capable of forming an alkyl metallocene cation; and, optionally, an organo aluminum compound.

In some embodiments, the polymerization process is carried out with the catalysts by operating in liquid phase, optionally in the presence of an inert hydrocarbon solvent, or in gas phase, using fluidized bed or mechanically agitated gas phase reactors.

In some embodiments, the hydrocarbon solvent is aromatic or aliphatic. In some embodiments, the aromatic solvent is toluene. In some embodiments, the aliphatic solvent is selected from the group consisting of propane, hexane, heptane, isobutane, cyclohexane, 2,2,4-trimethylpentane, and isododecane.

In some embodiments, the polymerization process is carried out by using liquid butene-1 as polymerization medium.

In some embodiments, the polymerization temperature is from 20 °C to 150 °C, alternatively from 50 °C to 90 °C, alternatively from 65 °C to 82 °C.

In some embodiments and to control the molecular weights, a molecular weight regulator is fed to the polymerization environment. In some embodiments, the molecular weight regulator is hydrogen.

As used herein, Mw/Mn values equal to or higher than 4 and the previously defined values of the $MI_{10}/MI_2$ ratio refer to amount to a broad molecular weight distribution (MWD).

In some embodiments, butene-1 polymers, having a broad MWD, are obtained by (co) polymerizing butene-1 in the presence of a catalyst. In some embodiments, butene-1 polymers, having a broad MWD, are obtained by mechanically blending butene-1 polymers having different molecular weights.

In some embodiments, a multistep polymerization process is used, wherein the butene-1 polymers with different molecular weights are prepared in sequence in two or more reactors with different reaction conditions, such as the concentration of molecular weight regulator fed in each reactor.

In some embodiments, different monomer amounts are fed into each reactor.

In some embodiments, the butene-1 polymer component B) is made from or containing two components B1) and B2) and the polymerization process is carried out in two or more reactors connected in series, wherein components B1) and B2) are prepared in separate subsequent stages, operating in each stage, except for the first stage, in the presence of the polymer formed and the catalyst used in the preceding stage.

In some embodiments, the catalyst is added in the first reactor and not subsequent reactors. In some embodiments, the catalyst is added in more than one reactor.

In some embodiments and for the polymer components, high MI values are obtained directly in polymerization. In some embodiments, high MI values are obtained by subsequent chemical treatment (chemical visbreaking).

In some embodiments, the chemical visbreaking of the polymer is carried out in the presence of free radical initiators, such as the peroxides.

In some embodiments, the peroxides have a decomposition temperature ranging from 150 °C to 250 °C. In some embodiments, the peroxides are selected from the group consisting of di-tert-butyl peroxide, dicumyl peroxide, 2,5-dimethyl-2,5-di(tert-butylperoxy)hexyne, and 2,5-dimethyl-2,5-di(tert-butylperoxy)hexane. In some embodiments, the peroxides are commercially available.

In some embodiments, the quantity of peroxide for the visbreaking process ranges from 0.001 to 0.5% by weight of the polymer, alternatively from 0.001 to 0.2%.

In some embodiments, the polyolefin composition (I) is obtainable by melting and mixing the components. In some embodiments, the mixing occurs in a mixing apparatus at temperatures of from 180 to 310 °C, alternatively from 190 to 280 °C, alternatively from 200 to 250 °C.

In some embodiments, the melt-mixing apparatus is selected from the group consisting of extruders and kneaders. In some embodiments, the melt-mixing apparatus is selected from the group consisting of twin-screw extruders. In some embodiments, the components are premixed at room temperature in a mixing apparatus and then the mixture is fed directly into the apparatus used for preparing the filament.

In some embodiments, the polyolefin composition (I) is further made from or containing additives. In some embodiments, the additives are selected from the group consisting of stabilizing agents (against heat, light, or U.V.), plasticizers, antacids, antistatic agents, water repellant agents, and pigments.

In some embodiments, the filament is made from or containing at least 70% by weight, alternatively at least 80% by weight alternatively at least 90% by weight, alternatively at least 95% by weight, of the polyolefin composition (I), with respect to the total weight of the filament or fiber. In some embodiments, the upper limit of the polyolefin composition (I) is 100% by weight.

In some embodiments, the filaments have a rounded cross-section or an angular cross-section. In some embodiments, the rounded cross-section is selected from the group consisting of circular, oval, lenticular, or multilobal cross-sections. In some embodiments, the angular cross-section is rectangular.

In some embodiments and as used herein, the filaments having rounded cross-section are referred to as "monofilaments." In some embodiments and as used herein, the filaments having angular cross-section, alternatively rectangular cross-section, are referred to as "tapes". As used herein, the term "filament" includes monofilaments and tapes.

In some embodiments, the tapes have a thickness from 0.03 to 1 mm and width from 2 to 20 mm.

In some embodiments, the filaments have a titer of at least 500 den.

In some embodiments, titer values for the filaments are of at least 800 den, alternatively at least 1000 den, alternatively at least 1300 den. In some embodiments, the upper limit is 7000 den for monofilaments. In some embodiments, the upper limit is 25000 den for tapes.

In some embodiments, the filament is stretched. In some embodiments, the stretching ratios are from 3.5:1 to 4.5:1.

In some embodiments, the filaments are used in the form of bundles or reels for preparation of various finished articles.

In some embodiments, the process for preparing polyolefin filaments includes the steps of:

(a) melting the polyolefin composition (I) and the other polymer components, when present;
(b) spinning the filaments or extruding a precursor film or tape; and
(c1) stretching the filaments or the precursor film or tape or
(c2) cutting the precursor film or tape and stretching the filaments.

In some embodiments, the melting step (a) and the spinning or extrusion step (b) are carried out continuously in sequence by using mono- or twin-screw extruders, equipped with a spinning or extrusion head. In some embodiments, the melt-mixing step is carried out in the same spinning or extrusion apparatus.

In some embodiments, the spinning heads have a plurality of holes with the same shape as the transversal section of the filament (monofilament or tape).

In some embodiments, the film extrusion heads are flat or annular dies.

In some embodiments, a precursor film or tape is obtained in step (b) and then processed in step (c) by cutting the precursor film or tape into tapes. In some embodiments, the stretching treatment is carried out on the precursor film or tape.

In some embodiments, the melting step (a) and the spinning or extrusion step (b) are carried out at temperatures from 180 to 310 °C, alternatively from 190 to 280 °C, alternatively from 200 to 250 °C. In some embodiments, the melting step (a) and the spinning or extrusion step (b) are carried out at temperatures as the melt-mixing step.

In some embodiments, spinning conditions are:

temperature in the extruder head from 200 to 300 °C; and
take-up speed for primary web (unstretched) from 1 to 50 m/min.

In some embodiments, film extrusion conditions are:

temperature in the extruder head from 200 to 300 °C; and
output value from 20 to 1000 kg/hour (on industrial plants).

In some embodiments, the filament or the precursor film obtained in step (b) are cooled by using one or more chill rolls or by immersion in water at a temperature from 5 to 40 °C.

In some embodiments and to carry out the stretching treatment, the filament (monofilament or tape) or the precursor tape are pre-heated at a temperature from 40 to 120-140 °C. In some embodiments, heating is achieved by using a hot air oven, a boiling water bath, or heated rolls or by irradiation.

In some embodiments, stretching is achieved by delivering the precursor tape or filament through a series of rollers having different rotation speeds.

In some embodiments, the stretching ratio is the ratio between the high speed of the rollers of the stretching unit and the speed of the rollers of the take-off unit (primary speed). In some embodiments and in the take-off unit, the tape or filament moving at low speed is heated before being stretched by applying faster speed.

The EB/SR values are obtained by dividing the elongation at break by the stretching ratio. For example, 3.5 for 3.5:1 and 4.5 for 4.5:1, respectively.

EXAMPLES

The following examples are illustrative and not intended to limit the scope of the appended claims.

The following analytical methods are used to characterize the polymer compositions and filaments.

Density

Determined according to ISO 1183-1:2012 at 23 °C.

Melt Flow Index MI

Determined according to ISO 1133-1:2011 with the specified temperature and load.

Intrinsic Viscosity I.V.

The sample was dissolved in tetrahydronaphthalene at 135 °C and then poured into a capillary viscometer. The viscometer tube (Ubbelohde type) was surrounded by a cylindrical glass jacket. This setup allowed for temperature control with a circulating thermostatic liquid. The downward passage of the meniscus was timed by a photoelectric device.

The passage of the meniscus in front of the upper lamp started the counter which had a quartz crystal oscillator. The counter stopped as the meniscus passed the lower lamp. The efflux time was registered and converted into a value of intrinsic viscosity through Huggins' equation (Huggins, M. L., J. Am. Chem. Soc., 1942, 64, 2716), using the flow time of the pure solvent at the same experimental conditions (same viscometer and same temperature). A single polymer solution was used to determine I.V.

Molecular Weight Distribution Determination

The determination of the molar mass distributions and the means Mn, Mw, and Mz and Mw/Mn derived therefrom was carried out by using a GPC-IR apparatus by PolymerChar, which was equipped with a column set of four PLgel Olexis mixed-bed (Polymer Laboratories) and an IR5 infrared detector (PolymerChar). The dimensions of the columns were 300×7.5 mm, and the particle size was 13 μm. The mobile phase flow rate was kept at 1.0 mL/min. The measurements were carried out at 150 °C. Solution concentrations were 2.0 mg/mL (at 150 °C), and 0.3 g/L of 2,6-diterbuthyl-p-chresole was added to prevent degradation. For GPC calculation, a universal calibration curve was obtained using 12 polystyrene (PS) standard samples supplied by PolymerChar (peak molecular weights ranging from 266 to 1220000). A third-order polynomial fit was used to interpolate the experimental data and obtain the relevant calibration curve. Data acquisition and processing were done using Empower 3 (Waters). The Mark-Houwink relationship was used to determine the molecular weight distribution and the relevant average molecular weights: the K values were $K_{PS}=1.21\times10^{-4}$ dL/g and $K_{PB}=1.78\times10^{-4}$ dL/g for PS and polybutene (PB) respectively, while the Mark-Houwink exponents α=0.706 for PS and α=0.725 for PB were used.

For butene/ethylene copolymers, the composition was assumed constant in the whole range of molecular weight and the K value of the Mark-Houwink relationship was calculated using a linear combination:

$$K_{EB} = x_E K_{PE} + x_B K_{PB}$$

where $K_{EB}$ is the constant of the copolymer, $K_{PE}$ ($4.06\times10^{-4}$, dL/g) and $K_{PB}$ ($1.78\times10^{-4}$ dL/g) are the constants of polyethylene (PE) and PB, $x_E$ and $x_B$ are the ethylene and the butene weight relative amount with $x_E+x_B=1$. The Mark-Houwink exponents α=0.725 was used for the butene/ethylene copolymers. End processing data treatment was fixed for the samples to include fractions up at 1000 in terms of molecular weight equivalent. Fractions below 1000 were investigated via GC.

Comonomer Content

Propylene Polymer A)

For propylene copolymers the comonomer content was determined by infrared spectroscopy by collecting the IR spectrum of the sample vs. an air background with a Fourier Transform Infrared spectrometer (FTIR). The instrument data acquisition parameters were:

purge time: 30 seconds minimum;
collect time: 3 minutes minimum;
apodization: Happ-Genzel;
resolution: 2 $cm^{-1}$.

Sample Preparation

Using a hydraulic press, a thick sheet was obtained by pressing about 1 gram of sample between two aluminum foils. If homogeneity was uncertain, a minimum of two pressing operations occurred. A small portion was cut from this sheet to mold a film. The film thickness was between 0.02-0.05 cm (8-20 mils).

Pressing temperature was 180±10 °C. (356 °F) at about 10 $kg/cm^2$ (142.2 PSI) pressure for about one minute. Then the pressure was released, and the sample was removed from the press and cooled to room temperature.

The spectrum of a pressed film of the polymer was recorded in absorbance vs. wavenumbers ($cm^{-1}$). The following measurements were used to calculate ethylene and butene-1 content:

Area (At) of the combination absorption bands between 4482 and 3950 $cm^{-1}$ which was used for spectrometric normalization of film thickness.

If ethylene was present, Area (AC2) of the absorption band between 750-700 $cm^{-1}$ after two proper consecutive spectroscopic subtractions of an isotactic, additive-free polypropylene spectrum was measured and then, if butene-1 was present, a standard spectrum of a butene-1-propylene random copolymer in the range 800-690 $cm^{-1}$ was used.

If butene-1 was present, the height (DC4) of the absorption band at 769 $cm^{-1}$ (maximum value), after two proper consecutive spectroscopic subtractions of an isotactic, additive-free polypropylene spectrum was measured and then, if ethylene was present, of a standard spectrum of an ethylene-propylene random copolymer in the range 800-690 $cm^{-1}$ was used.

To calculate the ethylene and butene-1 content, calibration straight lines for ethylene and butene-1 were obtained by using standard samples of ethylene and butene-1.

Butene-1 Polymer B)

The comonomer content of the butene-1 polymers was determined via FT-IR.

The spectrum of a pressed film of the polymer was recorded in absorbance vs. wavenumbers ($cm^{-1}$). The following measurements were used to calculate the ethylene content:

a) area ($A_t$) of the combination absorption bands between 4482 and 3950 $cm^{-1}$ which was used for spectrometric normalization of film thickness.
b) factor of subtraction ($FCR_{C2}$) of the digital subtraction between the spectrum of the polymer sample and the absorption band due to the sequences BEE and BEB (B: 1, butene units, E: ethylene units) of the methylenic groups ($CH_2$ rocking vibration).
c) Area ($A_{C2,block}$) of the residual band after subtraction of the $C_2$PB spectrum, which comes from the sequences EEE of the methylenic groups ($CH_2$ rocking vibration).

Apparatus

A Fourier Transform Infrared spectrometer (FTIR) was used.

A hydraulic press with platens heatable to 200 °C. (Carver or equivalent) was used.

Method

Calibration of (BEB+BEE) Sequences

A calibration straight line was obtained by plotting % (BEB+BEE) wt vs. $FCR_{C2}/A_t$. The slope $G_r$ and the intercept $I_r$ were calculated from a linear regression.

Calibration of EEE Sequences

A calibration straight line was obtained by plotting % (EEE) wt vs. $A_{C2,block}/A_t$. The slope $G_H$ and the intercept $I_H$ were calculated from a linear regression.

Sample Preparation

Using a hydraulic press, a thick sheet was obtained by pressing about 1.5 grams of sample between two aluminum foils. If homogeneity was uncertain, a minimum of two pressing operations occurred. A small portion was cut from this sheet to mold a film. The film thickness was between 0.1-0.3 mm.

The pressing temperature was 140±10 °C.

Because a crystalline phase modification takes place with time, the IR spectrum of the sample film was collected as soon as the sample was molded.

Procedure

The instrument data acquisition parameters were as follows:

Purge time: 30 seconds minimum.
Collect time: 3 minutes minimum.
Apodization: Happ-Genzel.
Resolution: 2 $cm^{-1}$.
Collect the IR spectrum of the sample vs. an air background.

Calculation

Calculate the concentration by weight of the BEE+BEB sequences of ethylene units:

$$\% \ (BEE+BEB)\text{wt} = G_r \cdot \frac{FCR_{C2}}{A_t} + I_r$$

Calculate the residual area (AC2,block) after the subtraction described above, using a baseline between the shoulders of the residual band.

Calculate the concentration by weight of the EEE sequences of ethylene units:

$$\% \ (EEE)\text{wt} = G_H \cdot \frac{A_{C2,block}}{A_t} + I_H$$

Calculate the total amount of ethylene percent by weight:

$$\% \ C2\text{wt} = [\% \ (BEE+BEB)\text{wt} + \% \ (EEE)\text{wt}]$$

Determination of X-Ray Crystallinity

The X-ray crystallinity was measured with an X-ray Diffraction Powder Diffractometer (XDPD) that used the Cu-Kα1 radiation with fixed slits and collected spectra between diffraction angle 2Θ=5° and 2Θ=35° with step of 0.1° every 6 seconds.

The samples were diskettes of about 1.5-2.5 mm of thickness and 2.5-4.0 cm of diameter made by compression molding. The diskettes were aged at room temperature (23 °C) for 96 hours.

After this preparation the specimen was inserted in the XDPD sample holder. The XRPD instrument was set to collect the XRPD spectrum of the sample from diffraction angle 2Θ=5° to 2Θ=35° with steps of 0.1° by using counting time of 6 seconds. At the end, the final spectrum was collected.

As used herein, the term "Ta" refers to the total area between the spectrum profile and the baseline, expressed in counts/sec·2Θ. As used herein, the term "Aa" refers to the total amorphous area, expressed in counts/sec·2Θ. As used herein, the term "Ca" refers to total crystalline area, expressed in counts/sec·2Θ.

The spectrum or diffraction pattern was analyzed in the following steps:

1) define a linear baseline for the whole spectrum and calculate the total area (Ta) between the spectrum profile and the baseline;
2) define an amorphous profile, along the whole spectrum, that separates the amorphous regions from the crystalline regions, according to the two-phase model;
3) calculate the amorphous area (Aa) as the area between the amorphous profile and the baseline;
4) calculate the crystalline area (Ca) as the area between the spectrum profile and the amorphous profile as Ca=Ta−Aa; and
5) calculate the degree of crystallinity (% Cr) of the sample using the formula:

$$\% \ Cr = 100 \times Ca/Ta$$

Fractions Soluble and Insoluble in Xylene at 25 °C. (XS-25 °C.)

2.5 g of polymer were dissolved in 250 ml of xylene at 135 °C under agitation. After 20 minutes, the solution was allowed to cool to 25 °C, under agitation, and then allowed to settle for 30 minutes. The precipitate was filtered with filter paper. The solution was evaporated under nitrogen flow. The residue was dried under vacuum at 80 °C until constant weight was reached. The percent by weight of polymer soluble (Xylene Solubles—XS) and insoluble at room temperature (25 °C) were calculated.

As used herein the percent by weight of polymer insoluble in xylene at room temperature (25 °C) was considered the isotactic index of the polymer. It is believed that this measurement corresponds to the isotactic index determined by extraction with boiling n-heptane, which constitutes the isotactic index of propylene polymers.

Fractions Soluble and Insoluble in Xylene at 0 °C. (XS-0 °C.)

2.5 g of the polymer sample were dissolved in 250 ml of xylene at 135 °C under agitation. After 30 minutes, the solution was allowed to cool to 100 °C, under agitation, and then placed in a water and ice bath to cool down to 0 °C. Then, the solution was allowed to settle for 1 hour in the water and ice bath. The precipitate was filtered with filter paper. During the filtering, the flask was left in the water and ice bath, thereby keeping the flask inner temperature as near to 0 °C as possible. Once the filtering was finished, the filtrate temperature was balanced at 25 °C, dipping the volumetric flask in a water-flowing bath for about 30 minutes. Then, the flask contents were divided in two 50 ml aliquots. The solution aliquots were evaporated in nitrogen flow, and the residue was dried under vacuum at 80 °C until a constant weight was reached. If the weight difference between the two residues was less than 3%, the test was terminated. If the weight difference between the two residues was not less than 3%, the test was repeated. The percent by weight of polymer soluble (Xylene Solubles at 0 °C=XS 0 °C) was calculated from the average weight of the residues. The insoluble fraction in o-xylene at 0 °C. (xylene Insolubles at 0 °C=XI %0 °C) is:

$$XI \ \% \ 0 \ ^\circ\text{C} = 100 - XS \ \% \ 0 \ ^\circ\text{C}$$

Melting and Crystallization Temperatures of Butene-1 Polymer B) Via Differential Scanning Calorimetry (DSC)

Differential scanning calorimetric (DSC) data were obtained with a Perkin Elmer DSC-7 instrument, using a weighed sample (5-10 mg) sealed into aluminum pans.

To determine the melting temperature of the polybutene-1 crystalline form I (TmI), the sample was heated to 200 °C with a scanning speed corresponding to 10 °C/minute, kept at 200 °C for 5 minutes, and then cooled down to 20 °C with a cooling rate of 10 °C/min. The sample was then stored for 10 days at room temperature. After 10 days, the sample was subjected to DSC, cooled to −20 °C, and then heated to 200 °C with a scanning speed corresponding to 10 °C/min. In this heating run, the highest temperature peak in the thermogram was taken as the melting temperature (TmI).

To determine the melting temperature of the polybutene-1 crystalline form II (TmII) and the crystallization temperature $T_c$, the sample was heated to 200 °C with a scanning speed corresponding to 10 °C/minute and kept at 200 °C for 5 minutes, thereby melting the crystallites and cancelling the thermal history of the sample. Successively, by cooling to −20 °C with a scanning speed corresponding to 10 °C/minute, the peak temperature was taken as crystallization temperature ($T_c$) and the area as the crystallization enthalpy. After standing 5 minutes at −20 °C, the sample was heated for the second time to 200 °C with a scanning speed corresponding to 10 °C/min. In this second heating run, the peak temperature was taken as the melting temperature of the polybutene-1 crystalline form II (TmII) and the area as the melting enthalpy (ΔHfII).

NMR Analysis of Chain Structure $^{13}$C NMR spectra were acquired on a Bruker AV-600 spectrometer equipped with cryo-probe, operating at 150.91 MHz in the Fourier transform mode at 120 °C.

The peak of the $T_{\beta\delta}$ carbon (nomenclature according to C. J. Carman, R. A. Harrington and C. E. Wilkes, *Macromolecules,* 10, 3, 536 (1977)) was used as internal standard at 37.24 ppm. The samples were dissolved in 1,1,2,2-tetrachloroethane-d2 at 120 °C with an 8% wt/v concentration. Each spectrum was acquired with a 90° pulse, 15 seconds of delay between pulses and CPD, thereby removing $^{1}$H-$^{13}$C coupling. About 512 transients were stored in 32K data points using a spectral window of 9000 Hz.

The assignments of the spectra, the evaluation of triad distribution and the composition were made according to Kakugo [M. Kakugo, Y. Naito, K. Mizunuma and T. Miyatake, *Macromolecules,* 16, 4, 1160 (1982)] and Randall [J. C. Randall, *Macromol. Chem Phys.,* C30, 211 (1989)] using the following:

$$BBB = 100\,(T_{\beta\beta})/S = I5$$

$$BBE = 100T_{\beta\delta}/S = I4$$

$$EBE = 100\,P_{\delta\delta}/S = I14$$

$$BEB = 100\,S_{\beta\beta}/S = I13$$

$$BEE = 100\,S_{\alpha\delta}/S = I7$$

$$EEE = 100(0.25\,S_{\gamma\delta} + 0.5\,S_{\delta\delta})/S = 0.25\ \ I9 + 0.5I10$$

| Area | Chemical Shift | Assignments | Sequence |
|---|---|---|---|
| 1 | 40.40-40.14 | Sαα | BBBB |
| 2 | 39.64<br>39-76-39.52 | Tδδ<br>Sαα | EBE<br>BBBE |
| 3 | 39.09 | Sαα | EBBE |
| 4 | 37.27 | Tβδ | BBE |
| 5 | 35.20-34.88 | Tββ | BBB |
| 6 | 34.88-34.49 | Sαγ | BBEB + BEBE |
| 7 | 34.49-34.00 | Sαδ | EBEE + BBEE |
| 8 | 30.91 | Sγγ | BEEB |

-continued

| Area | Chemical Shift | Assignments | Sequence |
|---|---|---|---|
| 9 | 30.42 | Sγδ | BEEE |
| 10 | 29.90 | Sδδ | EEE |
| 11 | 27.73-26.84 | Sβδ + 2B$_2$ | BBB + BBE<br>EBEE + BBEE |
| 12 | 26.70 | 2B$_2$ | EBE |
| 13 | 24.54-24.24 | Sββ | BEB |
| 14 | 11.22 | Pδδ | EBE |
| 15 | 11.05 | Pβδ | BBE |
| 16 | 10.81 | Pββ | BBB |

To a first approximation, the mmmm was calculated using 2B2 carbons as follows:

| Area | Chemical shift | assignments |
|---|---|---|
| B1 | 28.2-27.45 | mmmm |
| B2 | 27.45-26.30 | |

$$mmmm = B_1 * 100/(B_1 + B_2 - 2 * A_4 - A_7 - A_{14})$$

Tenacity, Elongation at Break and Load at Break of Filaments

In some instances, titer in deniers is used to measure the size of textile fibers and filaments. As used herein, the term “titer” refers to the weight (in grams) of 9000 m of filament or tape. At laboratory scale, the titer (in deniers) is determined by multiplying the weight of 100 m of filament or tape by 90 times.

Tenacity, Elongation at break, and Load at break are measured, after 7 days from preparation of the filament, by using a dynamometer on a single filament with clamps distance of 250 mm and applied elongation speed of 250 mm/min. In some instances, the dynamometer was a LLOYD RX-Plus.

The load cell provides the load at break (in grams or Kg) while elongation at break (%) is calculated as follows:

$$(\text{clamps distance at break} - \text{initial clamps distance}/\text{initial clamps distance}) * 100.$$

The tenacity (at break) was obtained by dividing the load at break (in grams) by the titer in deniers.

Flexural Modulus

According to norm ISO 178:2010, measured 10 days after molding.

Examples 1 and 2 and Comparative Examples 1 to 6

The following materials were used to prepare the polyolefin composition (I).

Propylene Polymer A)

Propylene homopolymer, having the properties reported in Table I below.

The propylene homopolymer was commercially available with trademark Moplen HP556E, from LyondellBasell.

Butene-1 Polymer B)

Butene-1 homopolymer was prepared with a Ziegler-Natta catalyst in liquid monomer polymerization, having the properties reported in Table I below.

The butene-1 homopolymer was commercially available with trademark Toppyl PB 0110M, from LyondellBasell.

TABLE I

| A | |
|---|---|
| MIL [g/10 min.] | 0.8 |
| Flexural Modulus [MPa] | 1400 |
| Fraction soluble in xylene at 25 °C [wt. %] | 3 |
| B | |
| Flexural Modulus [MPa] | 450 |
| $MI_{10}$ [g/10 min.] | 12 |
| $MI_2$ [g/10 min.] | 0.4 |
| Density [kg/m$^3$] | 914 |
| TmI [°C] | 128 |
| TmII [°C] | 117 |
| Mw/Mn | 7.4 |
| Fraction soluble in xylene at 0 °C [wt. %] | 2 |

Preparation of the Polyolefin Composition (I) and Filament Spinning

Components A), and B), containing a stabilizing additive composition, were dry mixed in a drum blender for 15 minutes, then spun into filaments with circular cross-section.

The apparatus used was an extruder Leonard, 25 mm diameter, 27 L/D long+Gear pump. The die had 10 holes, circular shaped, with a diameter of 1.2 mm.

The main process conditions were:

Temperature profile:

Cylinder 180-185-190-195 °C;

Pump 200 °C;

Adapter 205 °C;

Head-die 210 °C;

Melt temperature: 212+/−3 °C;

Output used: around 4 kg/h;

Cooling water bath: 21+/−1 °C;

Stretching oven set: 106+/−2 °C. (hot air);

Annealing oven set: 106+/−2 °C. (hot air);

Annealing factor: average −5.0% (slower).

The properties of the resulting filaments are reported in Table II.

TABLE II

| Example No. | 1 | 2 | Comp. 1 | Comp. 2 |
|---|---|---|---|---|
| Amount of A) [% by weight] | 70 | 50 | 70 | 50 |
| Amount of B) [% by weight] | 30 | 50 | 30 | 50 |
| Stretching ratio (SR) | 4:1 | 4:1 | 3:1 | 3:1 |
| Titer [den.] | 1610 | 1690 | 1660 | 1690 |
| Tenacity [g/den] | 2.54 | 2.06 | 1.85 | 1.51 |
| Elongation at break (EB) [%] | 113 | 120 | 180 | 160 |
| EB/SR | 28 | 30 | 60 | 53 |
| Load at break [kg] | 4.1 | 3.5 | 3.1 | 2.6 |
| **Example No.** | **Comp. 3** | **Comp. 4** | **Comp. 5** | **Comp. 6** |
| Amount of A) [% by weight] | 100 | 100 | 0 | 0 |
| Amount of B) [% by weight] | 0 | 0 | 100 | 100 |
| Stretching ratio | 2.5:1 | 3:1 | 2.5:1 | 4:1 |
| Titer [den.] | 1700 | 1680 | 1620 | 1600 |
| Tenacity [g/den] | 1.91 | 2.07 | 1.35 | 1.85 |
| Elongation at break (EB) [%] | 260 | 70 | 59 | 42 |
| EB/SR | 104 | 23 | 24 | 11 |
| Load at break [kg] | 3.3 | 3.5 | 2.2 | 3 |

What is claimed is:

1. A stretched polyolefin filament, having elongation at break EB equal or greater than 80% and a ratio EB/SR, where SR is the stretching ratio, of greater than 23 to lower than 45, comprising:

a polyolefin composition (I) comprising

A) from 40% to 78% by weight of a propylene polymer; and

B) from 22% to 60% by weight of a butene-1 polymer having:

1) A flexural modulus value from 100 to 800 MPa;

2) A ratio $MI_{10}/MI_2$ of from 20 to 40, wherein $MI_{10}$ is the Melt Flow Index MI at 190 °C with a load of 10 kg and $MI_2$ is the Melt Flow Index MI at 190 °C with a load of 2.16 kg, both measured according to ISO 1133-1:2011; and 3) A content of fraction soluble in xylene at 0 °C of 15% by weight or lower, referred to the total weight of B);

wherein the amounts of A) and B) are referred to the total weight of A)+B), the elongation at break is measured on a single filament, 7 days after preparation of the filament, using a dynamometer with clamps distance of 250 mm and applied elongation speed of 250 mm/min., and the flexural modulus is measured according to norm ISO 178:2010, 10 days after molding.

2. The stretched polyolefin filament of claim 1, having titer of at least 800 den.

3. The stretched polyolefin filament of claim 1, being a monofilament.

4. The stretched polyolefin filament of claim 1, wherein the SR is of ranges from 3.5:1 to 4.5:1.

5. The stretched polyolefin filament of claim 1, further having the following features, measured on a single filament, 7 days after preparation of the filament, using a dynamometer with clamps distance of 250 mm and applied elongation speed of 250 mm/min.:

Tenacity of 1.9 g/den or higher; or

Load at break from 2.5 to 5 kg.

6. The stretched polyolefin filament of claim 1, wherein the butene-1 polymer B) is selected from the group consisting of butene-1 homopolymers, butene-1 copolymers having a comonomer content of from 0.5% to 10% by mole, and mixtures thereof.

7. The stretched polyolefin filament of claim 1, wherein the butene-1 polymer B) has a molecular weight distribution Mw/Mn equal to higher than 4, wherein Mw is the weight average molar mass and Mn is the number average molar mass, measured by Gel Permeation Chromatography.

8. The stretched polyolefin filament of claim 1, wherein the butene-1 polymer B) has at least one of the following additional features:

a melting point TmII, measured by DSC (Differential Scanning calorimetry) in the second heating run with a scanning speed of 10 °C/min., equal to or lower than 125 °C;

an X-ray crystallinity of from 25 to 65%;

an intrinsic viscosity (I.V.) measured in tetrahydronaphthalene (THN) at 135 °C, equal to or lower than 5 dl/g;

an Mw equal to or greater than 100000 g/mol;

a melting point TmI, measured by DSC with a scanning speed of 10 °C/min., from 95 °C to 135 °C; or a density of 885-925 $kg/m^3$.

9. The stretched polyolefin filament of claim 1, wherein the propylene polymer A) is selected from the group consisting of propylene homopolymers, propylene copolymers, and mixtures thereof, having an amount of fraction insoluble in xylene at 25 °C equal to or higher than 85% by weight.

10. An article of manufacture comprising the stretched polyolefin filament of claim 1.

11. The article of manufacture of claim 10, selected from the group consisting of nets, ropes, and brushes.

* * * * *